(12) United States Patent
Gali et al.

(10) Patent No.: US 11,702,017 B2
(45) Date of Patent: Jul. 18, 2023

(54) VEHICULAR TRAILERING ASSIST SYSTEM WITH HITCH BALL DETECTION

(71) Applicant: Magna Electronics Inc., Auburn Hills, MI (US)

(72) Inventors: Jyothi P. Gali, Rochester Hills, MI (US); Harold E. Joseph, Brampton (CA); Prasanna Ananthakrishnan, Tamilnadu (IN); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 87 days.

(21) Appl. No.: 17/443,257

(22) Filed: Jul. 23, 2021

(65) Prior Publication Data

US 2022/0024391 A1 Jan. 27, 2022

Related U.S. Application Data

(60) Provisional application No. 62/705,967, filed on Jul. 24, 2020.

(51) Int. Cl.
*B60R 11/04* (2006.01)
*B60R 1/00* (2022.01)

(52) U.S. Cl.
CPC ............. *B60R 11/04* (2013.01); *B60R 1/003* (2013.01); *B60R 2300/808* (2013.01)

(58) Field of Classification Search
None
See application file for complete search history.

(56) References Cited

U.S. PATENT DOCUMENTS

| | | |
|---|---|---|
| 6,690,268 B2 | 2/2004 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,085,261 B2 | 7/2015 | Lu et al. |
| 9,446,713 B2 | 9/2016 | Lu et al. |
| 9,558,409 B2 | 1/2017 | Pliefke et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |

(Continued)

*Primary Examiner* — Rebecca A Volentine
(74) *Attorney, Agent, or Firm* — Honigman LLP

(57) ABSTRACT

A vehicular trailer assist system includes a camera at a vehicle and viewing at least a portion of a trailer hitched to the vehicle. A control, responsive to processing of frames of image data captured by the camera and during a calibration maneuver by the vehicle, determines an initial trailer template of trailer hitched to the vehicle. The control, during a turning portion of the calibration maneuver, and at least in part via processing of frames of image data captured by the camera, determines a hitch ball location of a hitch of the vehicle based on the determined initial trailer template. The control, after completion of the calibration maneuver, determines a current trailer angle of the trailer relative to the vehicle via processing of frames of image data captured by the camera and based on the determined hitch ball location as the vehicle is driven along a road.

18 Claims, 12 Drawing Sheets

(56) References Cited

U.S. PATENT DOCUMENTS

| | | |
|---|---|---|
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 2014/0085472 A1 | 3/2014 | Lu et al. |
| 2014/0160276 A1 | 6/2014 | Pliefke et al. |
| 2015/0002670 A1 | 1/2015 | Bajpai |
| 2015/0217693 A1 | 8/2015 | Pliefke et al. |
| 2017/0050672 A1 | 2/2017 | Gieseke et al. |
| 2017/0254873 A1 | 9/2017 | Koravadi |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1* | 9/2018 | Diessner .................. G06T 7/74 |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0297233 A1 | 9/2019 | Gali et al. |
| 2019/0347825 A1 | 11/2019 | Gupta et al. |
| 2019/0359134 A1* | 11/2019 | Yamamoto ............. B62D 13/00 |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0027490 A1* | 1/2021 | Taiana .................. B60D 1/245 |
| 2022/0027644 A1 | 1/2022 | Gali et al. |
| 2022/0028111 A1 | 1/2022 | Gali et al. |

\* cited by examiner

VEHICULAR TRAILERING ASSIST SYSTEM WITH HITCH BALL DETECTION

CROSS REFERENCE TO RELATED APPLICATION

The present application claims the filing benefits of U.S. provisional application Ser. No. 62/705,967, filed Jul. 24, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a trailer assist system for a vehicle that includes a camera disposed at a rear portion of a vehicle equipped with the vehicular trailering assist system. The camera views at least rearward of the vehicle, and, with a trailer hitched to a hitch of the vehicle via a pivoting joint hitch connection of the trailer to the hitch of the vehicle, the camera views at least a portion of the trailer hitched to the hitch of the vehicle. The camera captures frames of image data that include image data representative of at least a portion of the trailer hitched to the hitch of the vehicle. The system includes an electronic control unit (ECU) with electronic circuitry and associated software. The electronic circuitry includes an image processor operable to process frames of image data captured by the camera. With the trailer hitched to the hitch of the vehicle, the ECU, responsive to processing of frames of image data captured by the camera during a calibration maneuver by the vehicle, determines an initial trailer template of the trailer hitched to the hitch of the vehicle. The ECU, during a turning portion of the calibration maneuver, and at least in part via processing of frames of image data captured by the camera during the turning portion of the calibration maneuver, determines a hitch ball location of the hitch of the vehicle based on the determined initial trailer template. The ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or trailering assist system and/or driving assist system operates to capture images exterior of the vehicle and a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward (or forward) direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
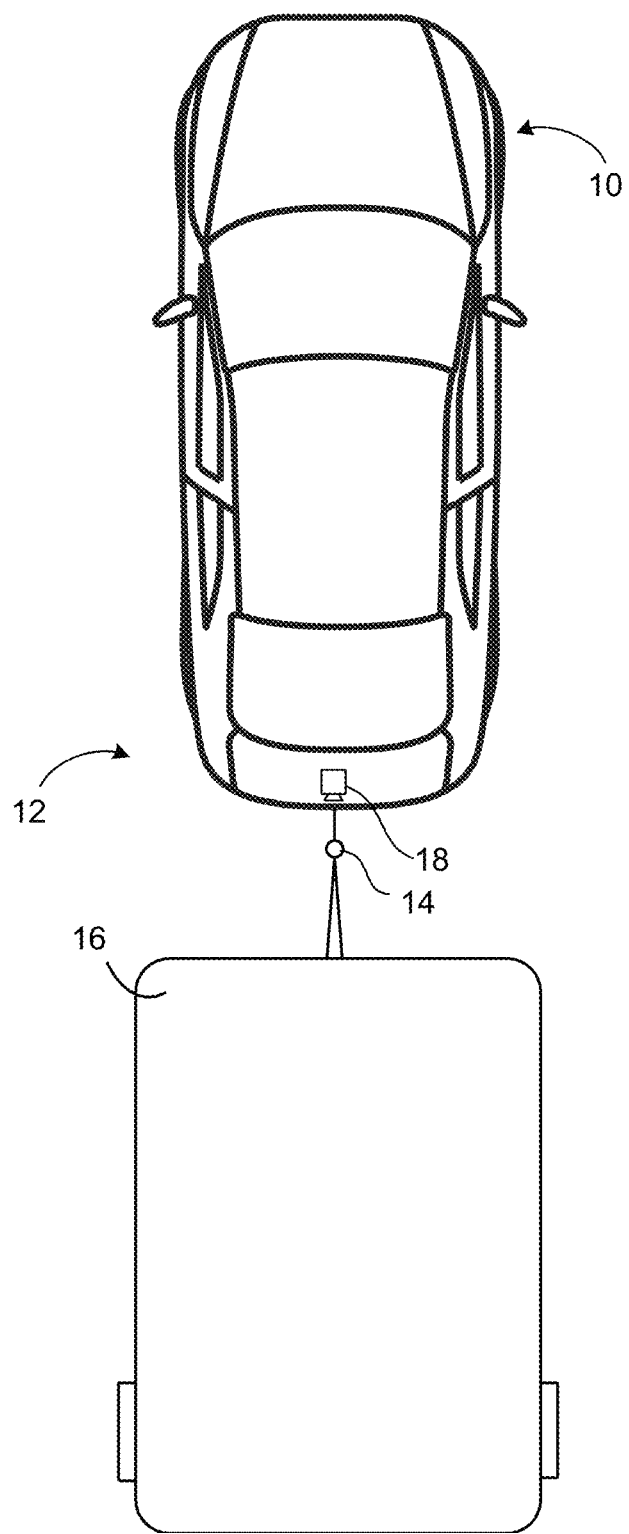
FIG. 1 is a plan view of a vehicle with a trailer assist system that is operable to steer a trailer along a trailer direction.

Referring now to the drawings and the illustrative embodiments depicted therein, a vehicle 10 includes a trailer assist system 12 that is operable to assist in backing up or reversing the vehicle with a trailer hitched to the vehicle via, for example, a hitch 14, and that may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). The imager comprises an imaging array of rows and columns of photosensing elements. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
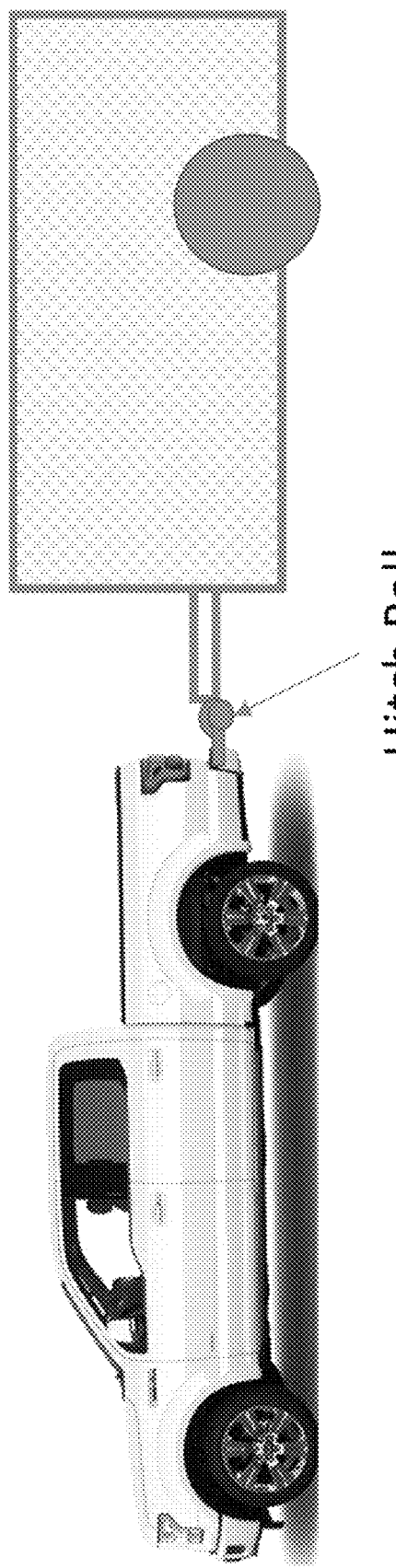
FIG. 2 is a schematic view of a vehicle with a hitch ball hitched to a trailer.
Figure 3:
FIG. 3 is an exemplary frame of image data of a trailer hitch captured by a rear-viewing camera disposed at a towing vehicle.

Referring now to FIG. 2, a trailer configured to be towed by a towing vehicle is commonly connected to the towing vehicle using a hitch. The hitch is an extension from the towing vehicle. The hitch ball is commonly defined as the point where the trailer will be attached to towing vehicle. The trailer tongue is connected to the hitch and may oscillate around the hitch ball. The trailer tongue pivots around relative to the hitch ball as the trailer moves during forward or reverse maneuvering of the vehicle towing the trailer. Determining the location (i.e., using image data captured by the rear-viewing camera 18) of the hitch ball is important for a number of trailering assist systems such as trailer angle detection (TAD) systems. FIG. 3 illustrates a top down image captured by a rear-view camera disposed at the rear of the towing vehicle (such as camera 18 of FIG. 1) that may be used to detect the location of the hitch ball. The trailer assist system may utilize aspects described in U.S. provisional applications, Ser. No. 62/705,966, filed Jul. 24, 2020 and titled VEHICULAR TRAILERING ASSIST SYSTEM WITH TRAILER COLLISION ANGLE DETECTION, and/or Ser. No. 62/705,968, filed Jul. 24, 2020 and titled VEHICULAR TRAILERING ASSIST SYSTEM WITH TRAILER CALIBRATION FEATURE, which are hereby incorporated herein by reference in their entireties.

Figure 4A:
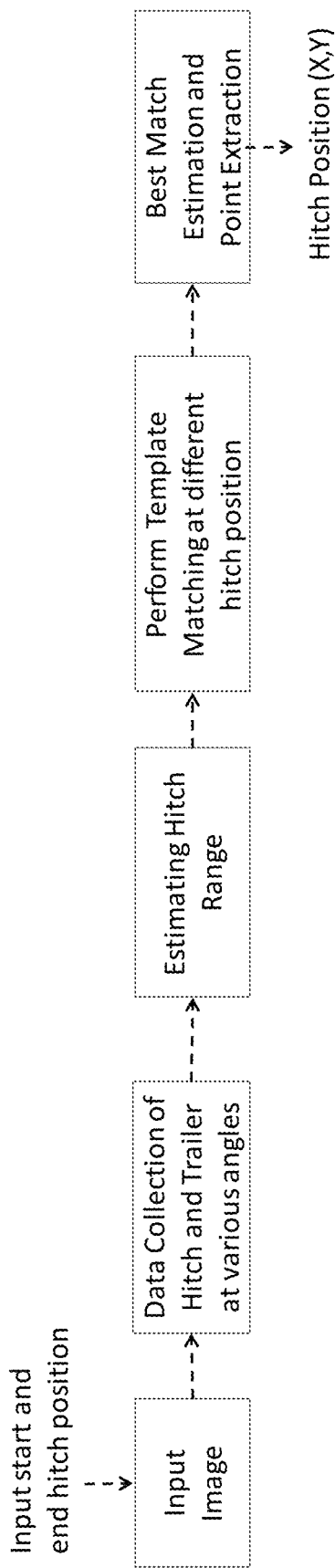
FIGS. 4A and 4B are schematic views of block diagrams of the trailer assist system of FIG. 1.
Figure 4B:
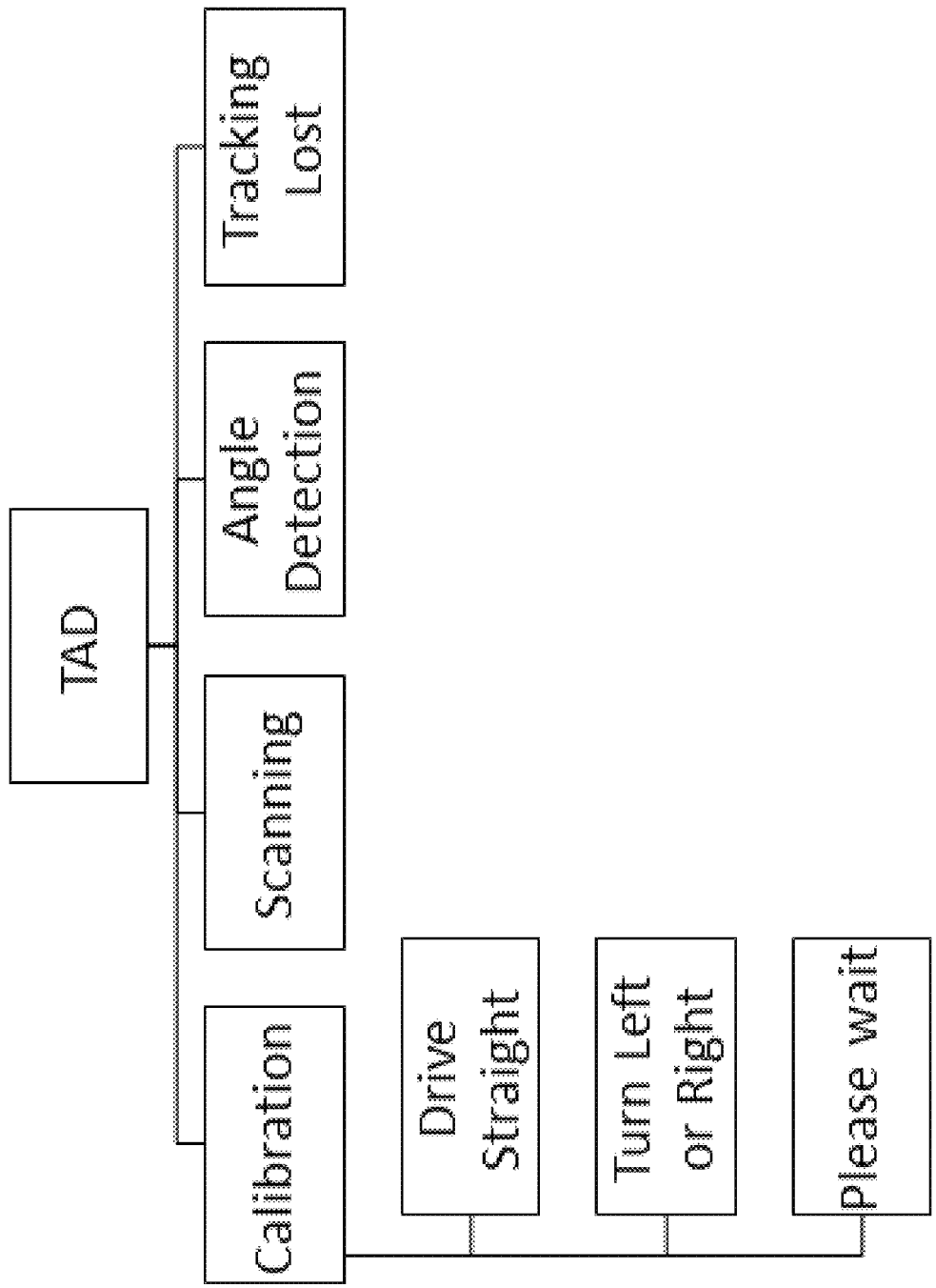

Referring now to FIG. 4A, the trailering assist system receives an input image (e.g., from a rear-viewing camera disposed at the rear of the towing vehicle) and performs data collection, using the image data, of the hitch and trailer at various angles. The system, based on the data collected, estimates a hitch range. The hitch range represents an area of the image data that the hitch ball may be present in. That is, there is only a fixed portion of the image data where the hitch ball may be present based on the fixed nature of the camera and hitch ball and traditional clearances between the vehicle and the hitch ball. The remaining portions of the image do not need to be processed for hitch ball detection, as the hitch ball cannot be present in those areas. For example, the system may divide the image data into a number of different parts or portions and determine which parts or portions the hitch ball may fall in. Optionally, the system reduces the image data to a number of rows (e.g., 15) of image data that that hitch ball may be present in. The system then performs template matching (e.g., by processing just the portions that include the estimated hitch range) at different hitch positions and determines a best match estimation and point extraction. Using the best match, the system determines the hitch ball position (e.g., an x and y coordinate in the image frame). As shown in FIG. 4B, the trailering assist system includes four states: a calibration state, a scanning state, an angle detection state, and a tracking lost state. The system performs the hitch ball detection during the calibration state. The calibration state includes three additional sub-states: a drive straight sub-state, a turn left or right sub-state, and a please wait sub-state.

The trailer assist system may obtain frames of image data captured by a camera that includes the hitch ball in its field of view. For example, in the top down image frame of FIG. 3, the system may determine an x and y coordinate of the hitch ball. When the camera is fixed and the hitch ball relative to the vehicle is fixed, the column of the location of the hitch ball is also fixed. For example, when the camera, such as a rear backup camera, is mounted at the center of the rear of the vehicle (as is traditional), the hitch ball will always be one of the "center" columns of photosensors of the imaging array of the camera. Therefore the system may need to only determine the row or rows of photosensors (i.e., the distance away from the vehicle) occupied by the hitch ball. The system may determine an initial hitch range in photosensors or pixels. For example, the system may set an initial hitch range between pixel rows 25 to 70 (out of 128 rows). The initial hitch range is a range of rows of photosensors or pixels that would include most, if not all, potential hitch ball locations. The starting of the hitch range depends at least in part on the rear bumper of the towing vehicle and the resolution of the camera (i.e., the number of rows in the image data).

Optionally, the system performs the hitch ball detection in two primary parts: hitch range detection and hitch ball detection. In the hitch range detection portion, the system reduces the amount of processing necessary to determine the row (i.e., the x position) of the hitch ball within a frame or frames of image data with a hitch range detection technique. The hitch range technique divides the initial hitch range (e.g., rows 25 to 70 of one or more frames of image data) into three equal portions (e.g., 15 rows each) and determines which portion the hitch ball is present in. Each row is a row of pixels (which are organized into rows and columns to form a frame of image data). Optionally, the initial hitch range is divided into more portions (e.g., four or five) or less portions (e.g., two). Once the system determines which portion the hitch ball is present in, the system may perform final processing only on the rows of photosensing elements associated with the selected portion and thus the final processing will be reduced to one third (or less) compared to the original number hitch range (e.g., only 15 rows instead of 45 rows). The system sends this new hitch range (e.g., the selected 15 rows) to the hitch ball detection portion to find a more accurate or exact hitch point within the selected range.

The hitch ball detection portion receives the input from the hitch range portion and begins processing in the new hitch range, which is a subset of the entire frame of image data (e.g., the selected one third portion of the initial hitch range). As discussed in more detail below, the hitch ball detection portion determines the exact row in the new hitch ball range that the hitch ball is present in.

The trailer assist system enters the calibration state to calibrate a new trailer that has not been hitched to the towing vehicle before or trailer that otherwise has not been previously calibrated by the system (i.e., a trailer template has not previously been determined for the trailer). For example, the system determines that the trailer is new/uncalibrated or that an operator of the vehicle indicates the trailer is new/uncalibrated via, for example, a display within the vehicle. During the calibration process, the system generates a trailer template, determines the hitch ball point, and determines a trailer collision angle (i.e., the trailer angle relative to the vehicle where the trailer will collide with the towing vehicle). Once in the calibration state (e.g., because the user chooses to calibrate the hitched trailer), the system automatically enters the first sub-state (i.e., the drive straight sub-state).

Figure 5:
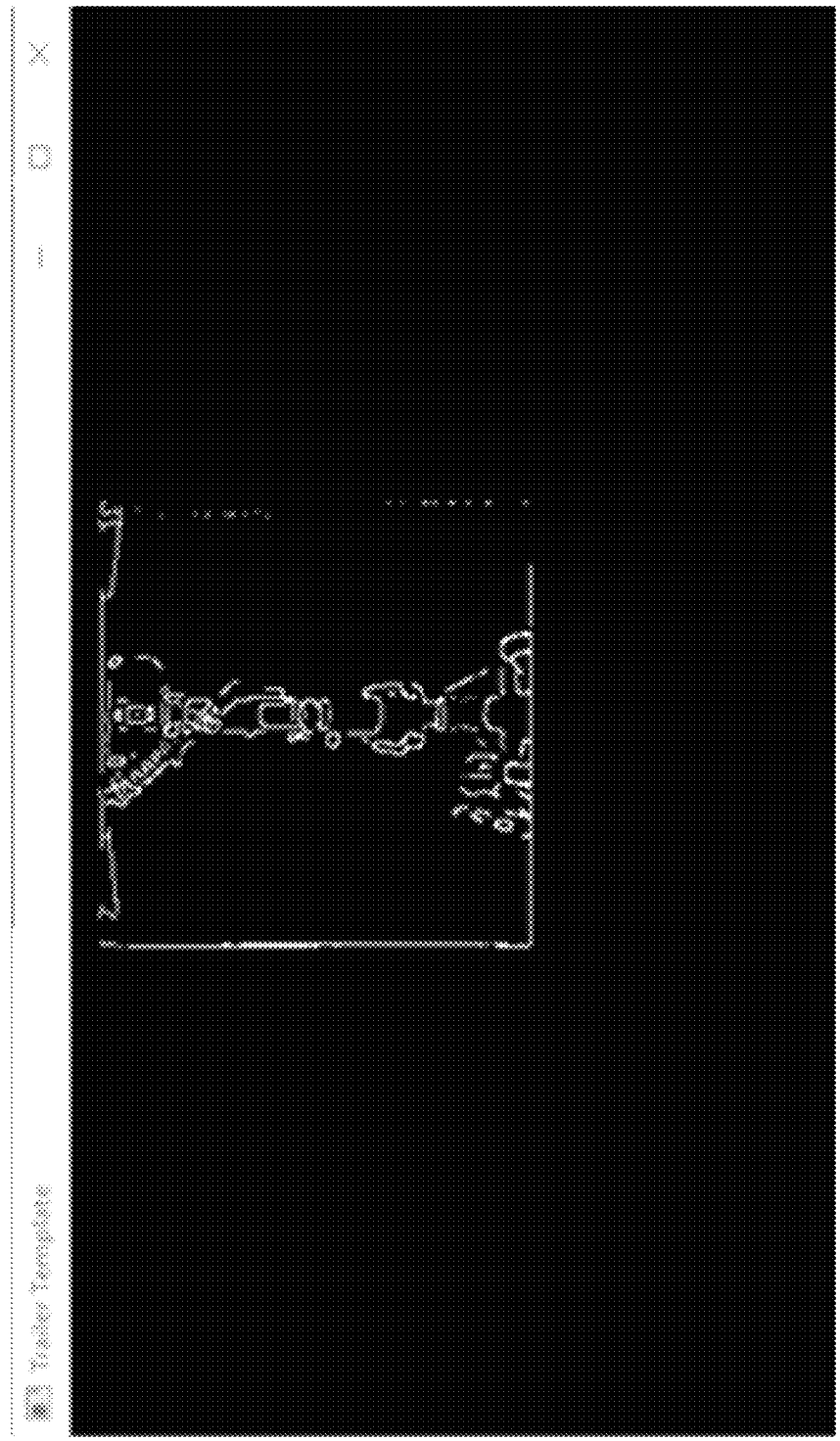
FIG. 5 is a schematic view of a trailer template.

During drive straight sub-state, the user or operator (or the system when the vehicle is semi-autonomous or autonomous) drives the vehicle in a straight line by maintaining a steering angle of zero or near zero. The operator may also maintain a vehicle speed that is above a speed threshold for a certain distance (e.g., above 5 mph for 20 meters). During the drive straight sub-state, the system generates the trailer template (FIG. 5) which the system uses to detect the hitch range and detect the hitch ball.

After the drive straight sub-state, the system enters the turn left or right sub-state. During this state the user performs a turn such as a U-turn (i.e., a 180 degree turn) to the left or the right with any steady wheel angle. After finishing the turn, the user sets the wheel angle to zero and drives forward to straighten both the towing vehicle and the trailer. When the vehicle begins turning both the hitch range algorithm and hitch detection algorithm may be enabled to start collecting data. The hitch range algorithm selects, for example, three hitch points which divides the initial hitch range of (e.g., rows 16 to 70) into three equal portions. While selecting these three hitch points, the system also performs angle detection in parallel and the dynamic template for all of the selected (e.g., three) hitch points is stored in a buffer or memory.

Figure 6:
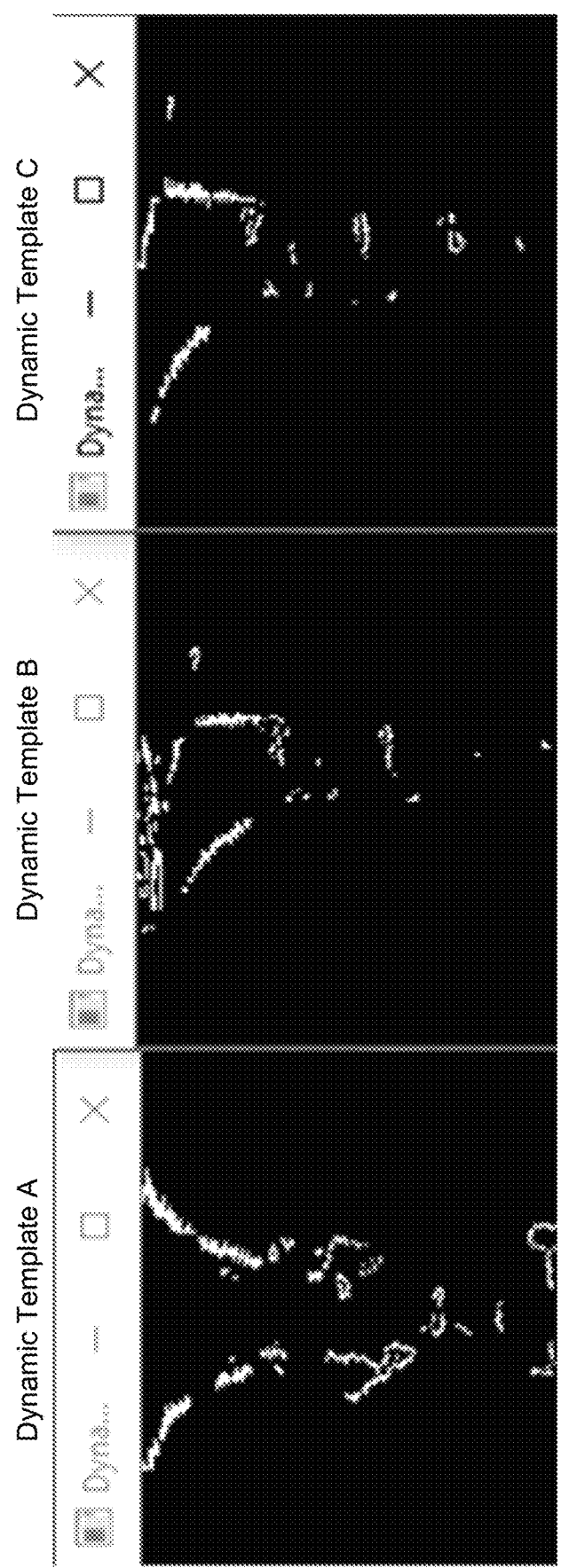
FIGS. 6A-6C are schematic views of dynamic trailer templates.

Optionally, the system determines kinematic angles in parallel (i.e., simultaneously) as the angle from the three hitch points vary. Using the kinematic angle as a reference, when the angle reaches, for example, 30 degrees, the hitch range algorithm may halt tracking the angle and determine a number (e.g., three) dynamic templates for detecting the hitch range (FIGS. 6A-6C).

Figure 7:
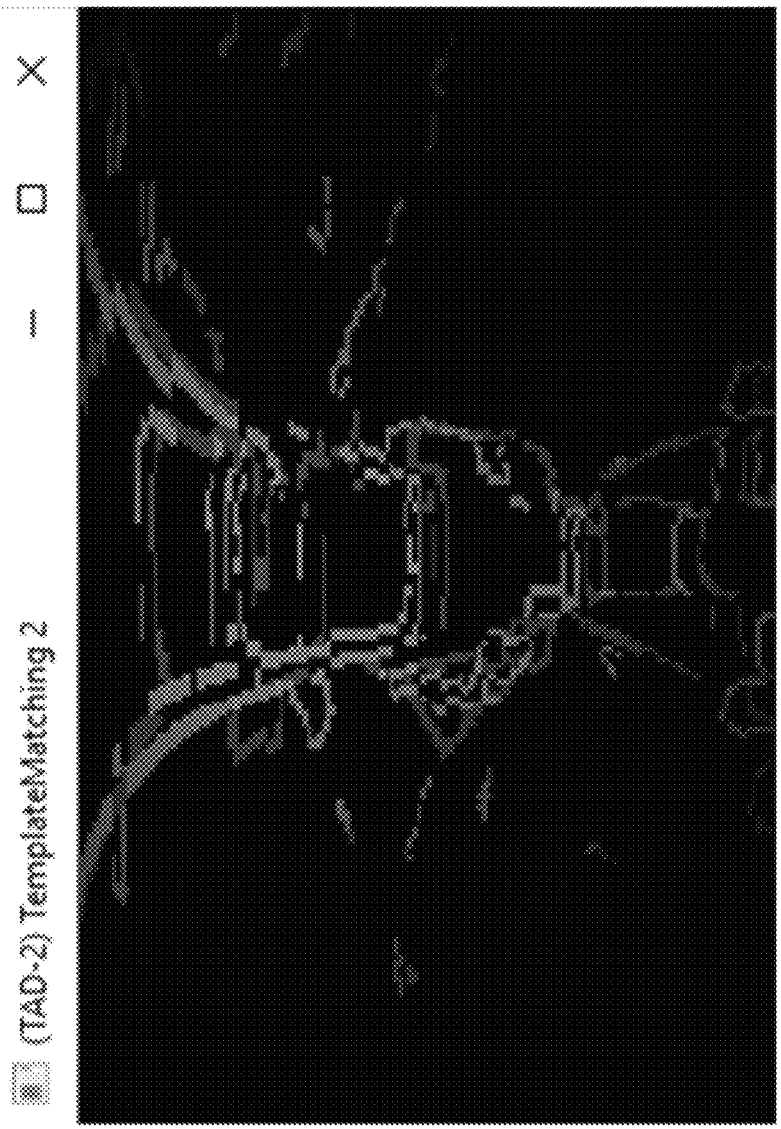
FIG. 7 is a schematic view of a trailer template matched with a dynamic trailer template.

Ideally, the dynamic template has a trailer angle not less than 70 percent of the kinematic angle, as otherwise that dynamic template may not be considered for processing. The system matches these dynamic templates with the warped initial trailer template. As shown in FIG. 7, the system selects the hitch point with the dynamic template having the highest matching score as the hitch range. That is, the system selects the hitch point associated with the dynamic template that most closely resembles the initial trailer template (generated during the drive straight sub-state). The system, from the selected hitch point, subtracts a number of points (e.g., four) to use as a starting point, while the system adds a number (e.g., eleven) points to use as an ending point. This system sends this new hitch range to the hitch detection algorithm for final processing.

Figure 8:
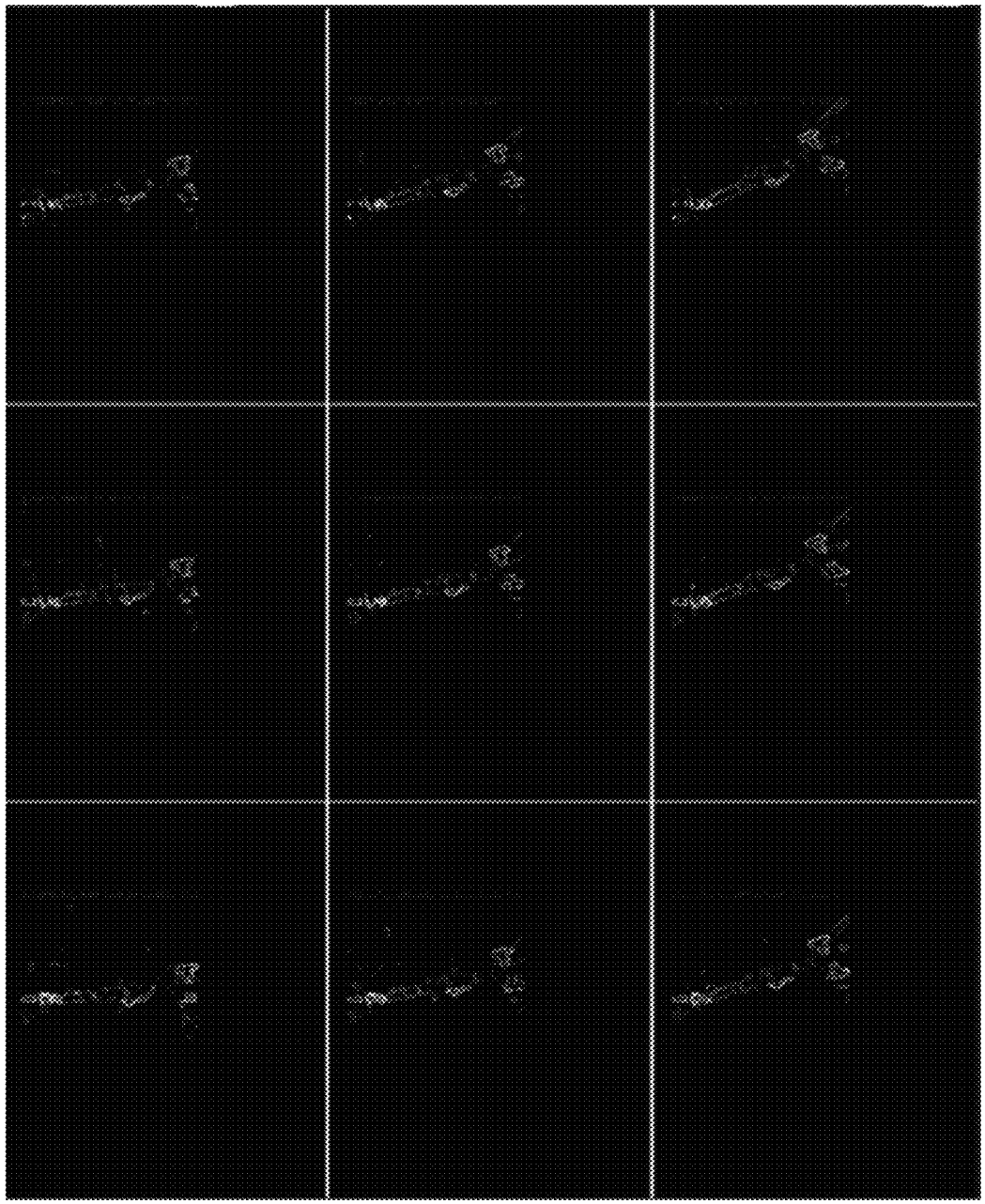
FIG. 8 is a schematic view of multiple consequent images of a trailer hitch at different angles during a calibration maneuver.

Referring now to FIG. 8, the hitch detection algorithm stores a number (e.g., nine) of different trailer template images (i.e., processed frames of captured image data) at the same number of different consequent angles. These images may be stored in the same buffer or memory as the dynamic templates. Once the system determines that the kinematic angle reaches an angle threshold, the system may halt sample collection and send the images stored in the buffer to next sub-state for processing (i.e., the please wait sub-state).

Optionally, both the hitch range and hitch detection algorithm stop once the kinematic angle reaches a threshold degree (e.g., 30 degrees). Once the vehicle completes the 180 degree turn, the vehicle may drive straight again for a short period (e.g., a few meters). That is, the system may not transition to the next state until the vehicle moves straight for few meters (or other threshold distance) above a speed threshold. Once this condition is satisfied, the system may transition to the please wait sub-state.

Figure 9:
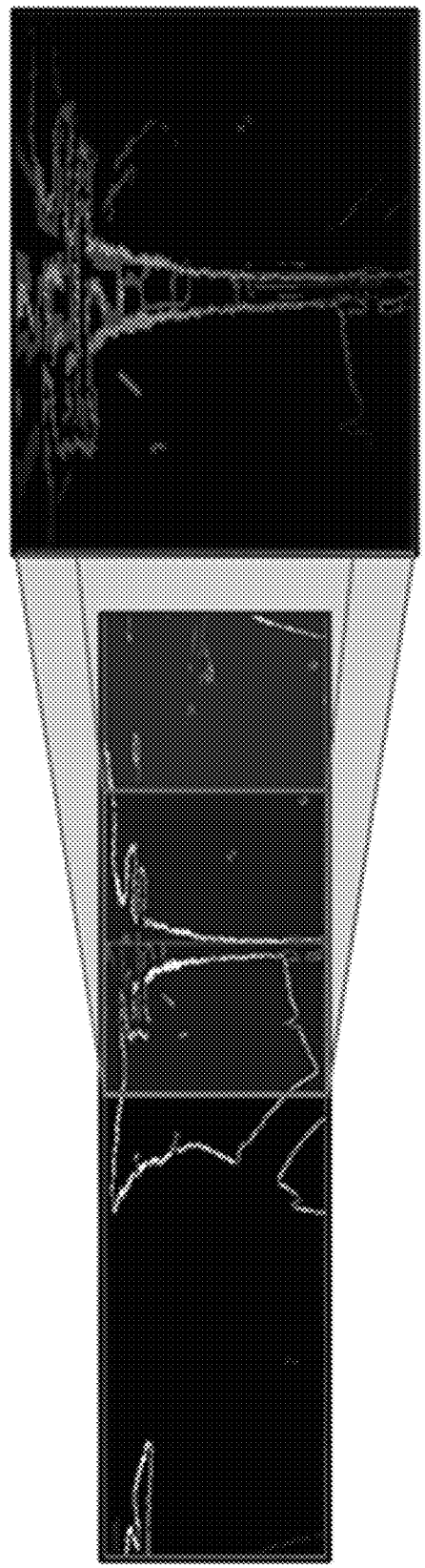
FIG. 9 is a schematic view of scanning a warped image and template matching.

The please wait sub-state activates the hitch detection algorithm and begins processing all the stored template images (e.g., 9 images). Referring now to FIG. 9, initially the images may be warped with the first hitch point from the hitch range algorithm and then matched with the warped trailer template. The highest score for each image may be saved in a buffer. The same process may be repeated for each of the remaining hitch points from the hitch range algorithm. The system may select the hitch point which has the highest combined score of all images as the hitch point.

Figure 10:
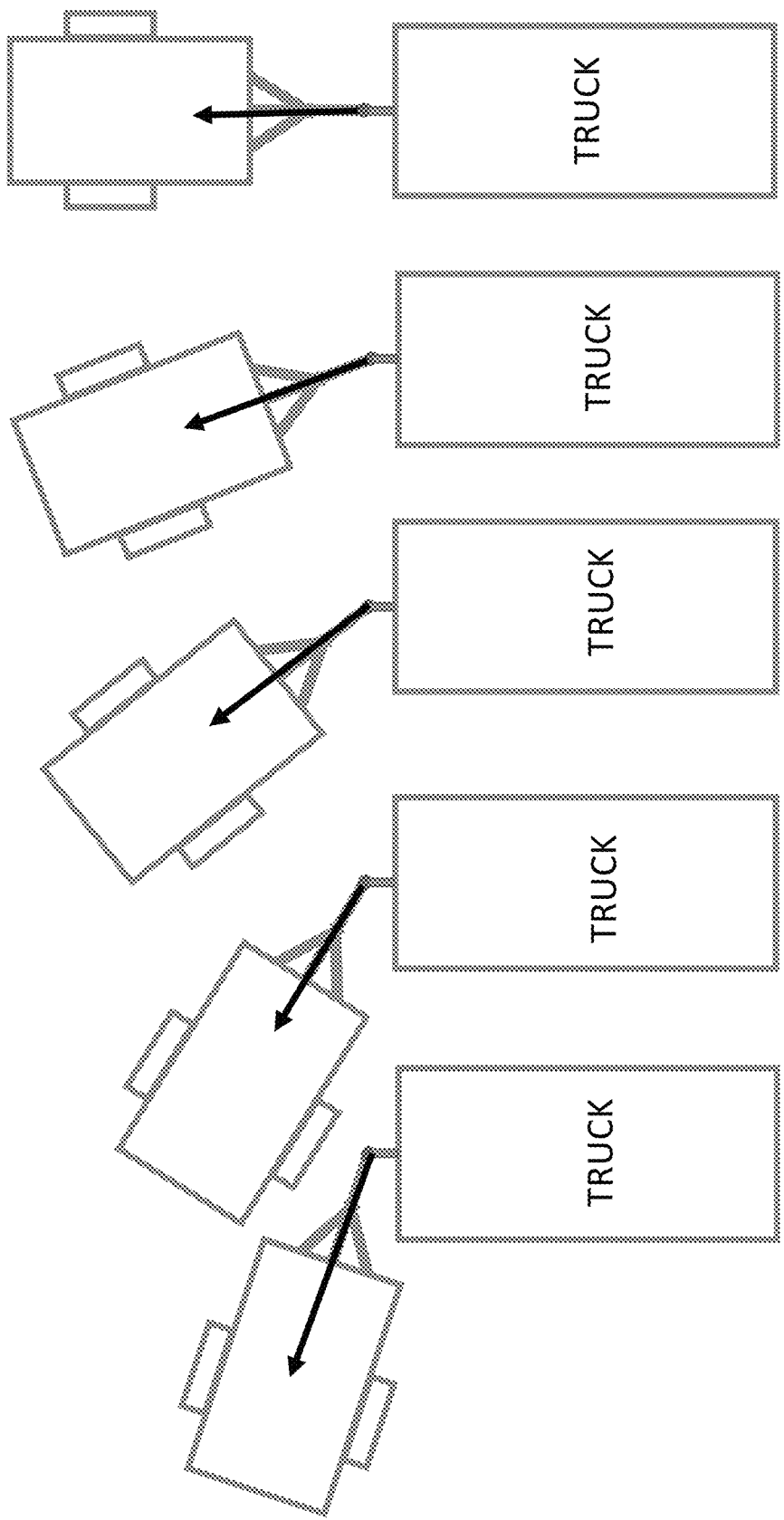
FIG. 10 is a schematic view of a vehicle with a trailer hitched at different trailer angles.
Figure 11:
FIG. 11 is another exemplary frame of image data of a trailer hitch captured by a rear-viewing camera disposed at a towing vehicle.

Thus, as shown in FIG. 10, the trailer assist system performs feature extraction at different trailer angles and compares trailer templates from different hitch positions and determines a best match. Based on the hitch position of the best match, the system determines the hitch ball position in x and y coordinates. The system is applicable to rear-camera based hitch ball detection (FIG. 11) and any application that requires the detection of a pivot point of a circular moving object.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,532,698; 10,552,976; 10,160,382; 10,086,870; 9,558,409; 9,446,713; 9,085,261 and/or 6,690,268, and/or U.S. Publication Nos. US-2020-0406967; US-2020-0356788; US-2020-0334475; US-2020-0361397; US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:
   a camera disposed at a rear portion of a vehicle equipped with the vehicular trailering assist system, the camera viewing at least rearward of the vehicle, wherein, with a trailer hitched to a hitch of the vehicle via a pivoting joint hitch connection of the trailer to the hitch of the vehicle, the camera views at least a portion of the trailer hitched to the hitch of the vehicle;
   wherein the camera captures frames of image data that include image data representative of at least a portion of the trailer hitched to the hitch of the vehicle;
   an electronic control unit (ECU) comprising electronic circuitry and associated software;
   wherein the electronic circuitry comprises an image processor operable to process frames of image data captured by the camera;
   wherein, with the trailer hitched to the hitch of the vehicle, the ECU, responsive to processing of frames of image data captured by the camera during a calibration maneuver by the vehicle, determines an initial trailer template for the trailer hitched to the hitch of the vehicle;
   wherein the ECU, during a turning portion of the calibration maneuver, and at least in part via processing of frames of image data captured by the camera during the turning portion of the calibration maneuver, determines a hitch ball location of the hitch of the vehicle based on the determined initial trailer template;
   wherein the ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road; and
   wherein the calibration maneuver comprises a first portion where the vehicle drives in a straight line, a second portion where the vehicle turns 180 degrees and a third portion where the vehicle drives straight.

2. The vehicular trailering assist system of claim 1, wherein the calibration maneuver is initiated by an operator of the vehicle when the initial trailer template for the trailer hitched to the vehicle has not previously been determined by the vehicular trailering assist system.

3. The vehicular trailering assist system of claim 1, wherein the ECU determines the initial trailer template during the first portion of the calibration maneuver.

4. The vehicular trailering assist system of claim 3, wherein the ECU determines the hitch ball location during the second portion of the calibration maneuver.

5. A vehicular trailering assist system, the vehicular trailering assist system comprising:
   a camera disposed at a rear portion of a vehicle equipped with the vehicular trailering assist system, the camera viewing at least rearward of the vehicle, wherein, with a trailer hitched to a hitch of the vehicle via a pivoting joint hitch connection of the trailer to the hitch of the vehicle, the camera views at least a portion of the trailer hitched to the hitch of the vehicle;

wherein the camera captures frames of image data that include image data representative of at least a portion of the trailer hitched to the hitch of the vehicle;

an electronic control unit (ECU) comprising electronic circuitry and associated software;

wherein the electronic circuitry comprises an image processor operable to process frames of image data captured by the camera;

wherein, with the trailer hitched to the hitch of the vehicle, the ECU, responsive to processing of frames of image data captured by the camera during a calibration maneuver by the vehicle, determines an initial trailer template for the trailer hitched to the hitch of the vehicle;

wherein the ECU, during a turning portion of the calibration maneuver, and at least in part via processing of frames of image data captured by the camera during the turning portion of the calibration maneuver, determines a hitch ball location of the hitch of the vehicle based on the determined initial trailer template;

wherein the ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road; and wherein the ECU determines an initial hitch ball range and determines the hitch ball location based on the determined initial trailer template and the initial hitch ball range.

6. The vehicular trailering assist system of claim 5, wherein the ECU splits at least one frame of captured image data into a number of portions based on the initial hitch ball range, and wherein the ECU performs an initial processing on each of the number of portions to determine which portion contains the hitch ball location.

7. The vehicular trailering assist system of claim 6, wherein the ECU performs final processing only on the determined portion to determine the hitch ball location within the determined portion, and wherein the determined portion is a subset of image data of the at least one frame of captured image data.

8. A vehicular trailering assist system, the vehicular trailering assist system comprising:

a camera disposed at a rear portion of a vehicle equipped with the vehicular trailering assist system, the camera viewing at least rearward of the vehicle, wherein, with a trailer hitched to a hitch of the vehicle via a pivoting joint hitch connection of the trailer to the hitch of the vehicle, the camera views at least a portion of the trailer hitched to the hitch of the vehicle;

wherein the camera captures frames of image data that include image data representative of at least a portion of the trailer hitched to the hitch of the vehicle;

an electronic control unit (ECU) comprising electronic circuitry and associated software;

wherein the electronic circuitry comprises an image processor operable to process frames of image data captured by the camera;

wherein, with the trailer hitched to the hitch of the vehicle, the ECU, responsive to processing of frames of image data captured by the camera during a calibration maneuver by the vehicle, determines an initial trailer template for the trailer hitched to the hitch of the vehicle;

wherein the ECU, during a turning portion of the calibration maneuver, and at least in part via processing of frames of image data captured by the camera during the turning portion of the calibration maneuver, determines a hitch ball location of the hitch of the vehicle based on the determined initial trailer template;

wherein the ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road; and wherein the ECU, during the calibration maneuver, determines a number of dynamic trailer templates at different positions during the calibration maneuver, and wherein the ECU determines the hitch ball location based at least in part on comparisons between the number of dynamic trailer templates and the determined initial trailer template.

9. The vehicular trailering assist system of claim 8, wherein each dynamic template is associated with a different point during a turn of the calibration maneuver.

10. A vehicular trailering assist system, the vehicular trailering assist system comprising:

a camera disposed at a rear portion of a vehicle equipped with the vehicular trailering assist system, the camera viewing at least rearward of the vehicle, wherein, with a trailer hitched to a hitch of the vehicle via a pivoting joint hitch connection of the trailer to the hitch of the vehicle, the camera views at least a portion of the trailer hitched to the hitch of the vehicle;

wherein the camera captures frames of image data that include image data representative of at least a portion of the trailer hitched to the hitch of the vehicle;

an electronic control unit (ECU) comprising electronic circuitry and associated software;

wherein the electronic circuitry comprises an image processor operable to process frames of image data captured by the camera;

wherein, with the trailer hitched to the vehicle, the ECU determines whether a trailer template for the trailer hitched to the hitch of the vehicle has not previously been determined by the vehicular trailering assist system;

wherein, with the trailer hitched to the hitch of the vehicle, the ECU, responsive to determining that the trailer template for the trailer hitched to the hitch of the vehicle has not previously been determined by the vehicular trailering assist system, and responsive to processing of frames of image data captured by the camera during a calibration maneuver by the vehicle, determines an initial trailer template for the trailer hitched to the hitch of the vehicle;

wherein the ECU, during a turning portion of the calibration maneuver, and at least in part via processing of frames of image data captured by the camera during the turning portion of the calibration maneuver, determines a hitch ball location of the hitch of the vehicle based on the determined initial trailer template;

wherein the ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road; and wherein the calibration maneuver comprises a first portion where the vehicle drives in a straight line, a second portion where the vehicle turns 180 degrees and a third portion where the vehicle drives straight.

11. The vehicular trailering assist system of claim 10, wherein the ECU determines the initial trailer template during the first portion of the calibration maneuver.

12. The vehicular trailering assist system of claim 11, wherein the ECU determines the hitch ball location during the second portion of the calibration maneuver.

13. A vehicular trailering assist system, the vehicular trailering assist system comprising:

a camera disposed at a rear portion of a vehicle equipped with the vehicular trailering assist system, the camera viewing at least rearward of the vehicle, wherein, with a trailer hitched to a hitch of the vehicle via a pivoting joint hitch connection of the trailer to the hitch of the vehicle, the camera views at least a portion of the trailer hitched to the hitch of the vehicle;

wherein the camera captures frames of image data that include image data representative of at least a portion of the trailer hitched to the hitch of the vehicle;

an electronic control unit (ECU) comprising electronic circuitry and associated software;

wherein the electronic circuitry comprises an image processor operable to process frames of image data captured by the camera;

wherein, with the trailer hitched to the vehicle, the ECU determines whether a trailer template for the trailer hitched to the hitch of the vehicle has not previously been determined by the vehicular trailering assist system;

wherein, with the trailer hitched to the hitch of the vehicle, the ECU, responsive to determining that the trailer template for the trailer hitched to the hitch of the vehicle has not previously been determined by the vehicular trailering assist system, and responsive to processing of frames of image data captured by the camera during a calibration maneuver by the vehicle, determines an initial trailer template for the trailer hitched to the hitch of the vehicle;

wherein the ECU, during a turning portion of the calibration maneuver, and at least in part via processing of frames of image data captured by the camera during the turning portion of the calibration maneuver, determines a hitch ball location of the hitch of the vehicle based on the determined initial trailer template;

wherein the ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road; and wherein the ECU determines an initial hitch ball range and determines the hitch ball location based on the determined initial trailer template and the initial hitch ball range.

14. A vehicular trailering assist system for a vehicle, the vehicular trailering assist system comprising:

a camera disposed at a rear portion of a vehicle equipped with the vehicular trailering assist system, the camera viewing at least rearward of the vehicle, wherein, with a trailer hitched to a hitch of the vehicle via a pivoting joint hitch connection of the trailer to the hitch of the vehicle, the camera views at least a portion of the trailer hitched to the hitch of the vehicle;

wherein the camera captures frames of image data that include image data representative of at least a portion of the trailer hitched to the hitch of the vehicle;

an electronic control unit (ECU) comprising electronic circuitry and associated software;

wherein the electronic circuitry comprises an image processor operable to process frames of image data captured by the camera;

wherein, with the trailer hitched to the vehicle, the vehicle performs a calibration maneuver comprising a first portion where the vehicle drives in a straight line, a second portion where the vehicle turns 180 degrees and a third portion where the vehicle drives straight;

wherein the ECU, during the first portion of the calibration maneuver by the vehicle, determines an initial trailer template for the trailer hitched to the hitch of the vehicle;

wherein the ECU, during the second portion of the calibration maneuver, and at least in part via processing of frames of image data captured by the camera during the second portion of the calibration maneuver, determines a hitch ball location of the hitch of the vehicle based on the determined initial trailer template; and wherein the ECU, after completion of the calibration maneuver, and via processing of frames of image data captured by the camera as the vehicle is driven along a road, and based on the determined hitch ball location, determines a current trailer angle of the trailer relative to a longitudinal axis of the vehicle as the vehicle is driven along the road.

15. The vehicular trailering assist system of claim 14, wherein the ECU determines an initial hitch ball range and determines the hitch ball location based on the determined initial trailer template and the initial hitch ball range.

16. The vehicular trailering assist system of claim 15, wherein the ECU splits at least one frame of captured image data into a number of portions based on the initial hitch ball range, and wherein the ECU performs an initial processing on each of the number of portions to determine which portion contains the hitch ball location.

17. The vehicular trailering assist system of claim 16, wherein the ECU performs final processing only on the determined portion to determine the hitch ball location within the determined portion, and wherein the determined portion is a subset of image data of the at least one frame of captured image data.

18. The vehicular trailering assist system of claim 14, wherein the ECU, during the calibration maneuver, determines a number of dynamic trailer templates at different positions during the calibration maneuver, and wherein the ECU determines the hitch ball location based at least in part on comparisons between the number of dynamic trailer templates and the determined initial trailer template.

\* \* \* \* \*